(12) United States Patent
Lindsay (10) Patent No.: US 7,017,925 B2
(45) Date of Patent: Mar. 28, 2006

(54) PORTABLE AXLE AND TIRE ASSEMBLY

(76) Inventor: Fredrick H. Lindsay, 9393 120th La. North, Seminole, FL (US) 33772-2636

( * ) Notice: Subject to any disclaimer, the term of this patent is extended or adjusted under 35 U.S.C. 154(b) by 385 days.

(21) Appl. No.: 10/667,618

(22) Filed: Sep. 22, 2003

(65) Prior Publication Data

US 2005/0062241 A1   Mar. 24, 2005

(51) Int. Cl.
*B60G 9/00* (2006.01)
(52) U.S. Cl. ............... 280/124.1; 280/124.17
(58) Field of Classification Search ........ 280/788–789, 280/680, 686, 676, 81.1, 124.17, 124.125, 280/79.3, 79.6, 414.2, 149.1–149.2, 124.1, 280/79.11, 63, 799; 180/209; 301/124.1
See application file for complete search history.

(56) References Cited

U.S. PATENT DOCUMENTS

| 3,796,440 A | * | 3/1974 | Shave | ................ 296/35.3 |
| 4,084,834 A | * | 4/1978 | Becker | ................ 280/789 |
| 5,992,121 A | * | 11/1999 | Lindsay | ................ 52/690 |
| 6,254,132 B1 | * | 7/2001 | Lindsay | ................ 280/789 |

* cited by examiner

*Primary Examiner*—Paul N. Dickson
*Assistant Examiner*—Drew J. Brown
(74) *Attorney, Agent, or Firm*—Dennis G. LaPointe (57) ABSTRACT

A method of and assembly for transporting a manufactured building using a portable axle and tire assembly for temporary mounting to each beam of the frame of a transported manufactured building, comprising a pair of rims each mounted to a hub extension, which is in turn attached to yolk. The yolk is attached to an end of an axle. A pair of springs are clamped to said axle. A saddle assembly to which the springs are attached is configured for saddling and receiving the longitudinal beam of the frame of the manufactured building being transported. Each upright member is interconnected with a corresponding longitudinal member. An opposite end of each spring is attached to opposite ends of the longitudinal member. Included are tabs for temporarily attaching the saddle assembly to a flange of the longitudinal beam.

7 Claims, 10 Drawing Sheets

PORTABLE AXLE AND TIRE ASSEMBLY

BACKGROUND OF THE INVENTION

1. Field of the Invention

The invention relates to a reusable portable axle and tire saddle assembly for use in transporting manufactured buildings over the roadways.

2. Description of Related Art

Transporting manufactured buildings over the highways has been done for years using axle assemblies which are part of the undercarriage frame of the manufactured building. However, savings of $1600 to $2000 may be obtained for each manufactured floor system undercarriage by providing a reusable portable axle and tire assembly.

In addition, current axle assemblies inherently limit the height of a manufactured building, particularly the roof pitch, due to bridge underpass constraints. The saddle configuration of a portable axle and tire assembly, as presented by this invention, will enable a lower profile transportation of the manufactured building thereby allowing roofs to incorporate steeper pitches. Of course, snow load capacity will also inherently increase with the steeper sloped roof of the manufactured building.

Further, prior art axle assemblies traditionally have three axles and six wheels in the undercarriage of the manufactured building. Such an arrangement also provides six brakes. An object of the present invention would enable a manufacturer to transport heavier manufactured buildings more safely due to an increase in number of brakes and tires.

The axles manufactured today used on factory built floor systems for manufactured buildings are designed for 6000 lb. or 7000 lb. loading. The manufactured homes are now built with sheet rock and other materials that increase the weight of the building going down the highway so much that it is necessary to use eight (8) 7000 lb. axles. When placing eight axles underneath the carrier, then it is near impossible to turn the truck and building around some roads.

SUMMARY OF THE INVENTION

The present invention is a portable axle and tire assembly for use in transporting manufactured buildings over the roadways.

Figure 1:
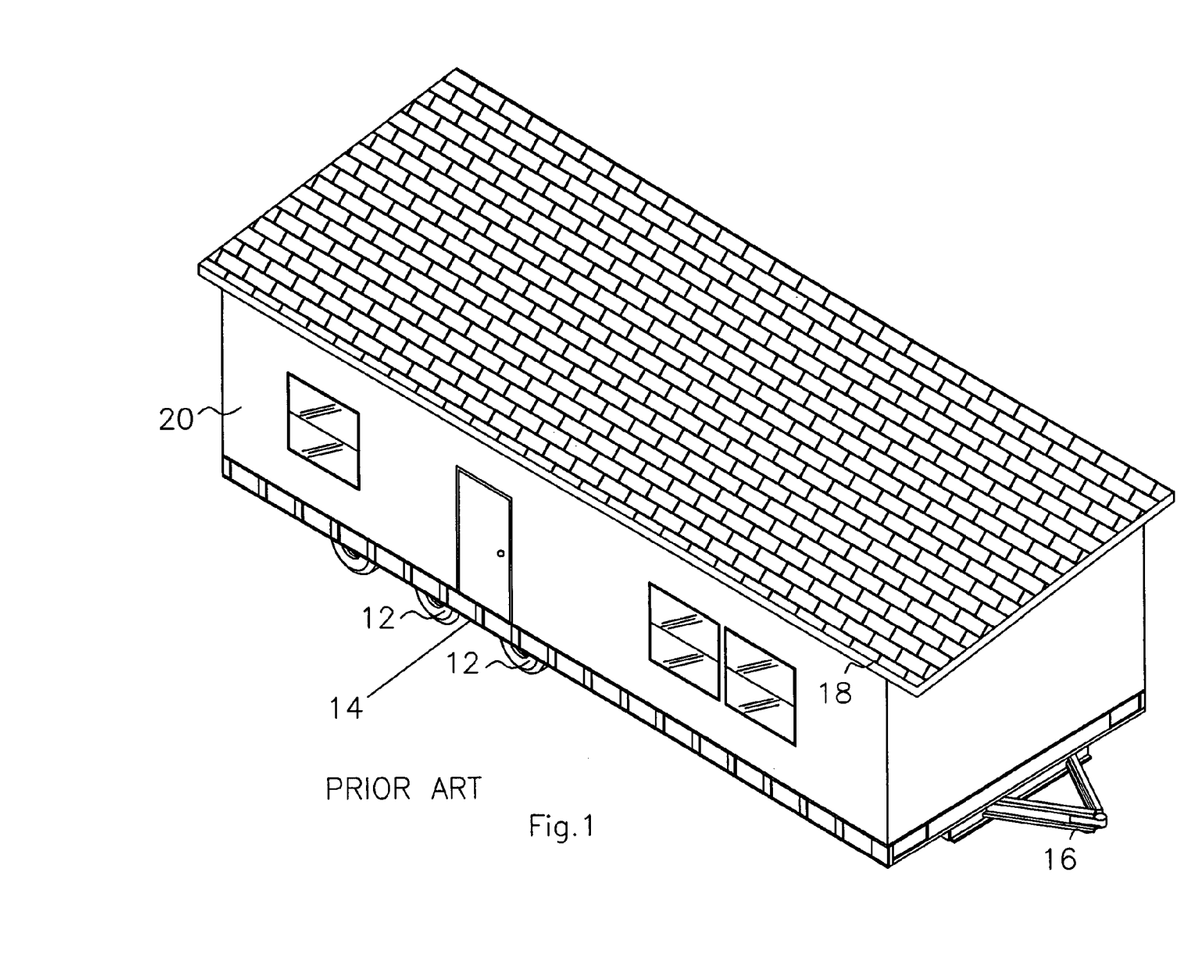
FIG. 1 is a perspective view of a section of a double-wide manufactured building on a traditional frame and wheel and axle assembly.

As depicted in FIG. 1, the prior art method traditionally includes six tires 12 mounted to three axles, not visible in the perspective view of FIG. 1. The axles are mounted to the undercarriage of frame 14 of the manufactured building 20. The spring hangers of the axle assemblies are typically welded to the frame I-beam. The springs are then fastened to the spring hangers. Typical axle track widths are: a 75½ inch axle, that is, from the center of one longitudinal I-beam to the center of the other longitudinal I-beam; an 82½ inch axle; and a 99½ inch axle. The roof pitch 18 for double-wide manufactured buildings is limited due to the inherent profile obtained with traditional axle assemblies. Hitch 16 connects to the transport vehicle.

Figure 2:
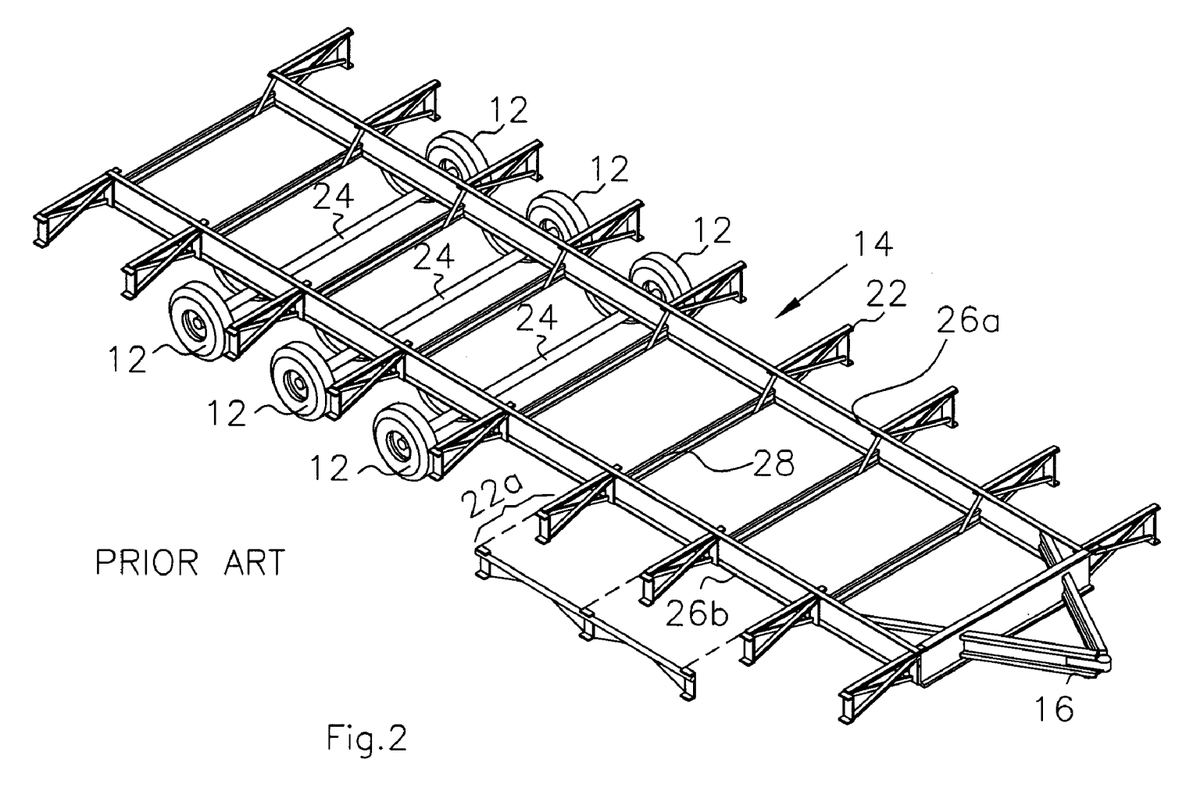
FIG. 2 is a perspective view of a chassis system utilizing prior art wheel and axle system on an improved frame system for manufactured buildings.

As depicted in FIG. 2, an improved undercarriage or frame 14 incorporates the use of outriggers 22 extending from respective longitudinal I-beams 26a,26b, which are spaced apart by parallel cross-members 28. This frame 14 assembly may include extendable outriggers 22a. FIG. 2 also depicts the use of traditional tire and axle assemblies 12,24.

Figure 3:
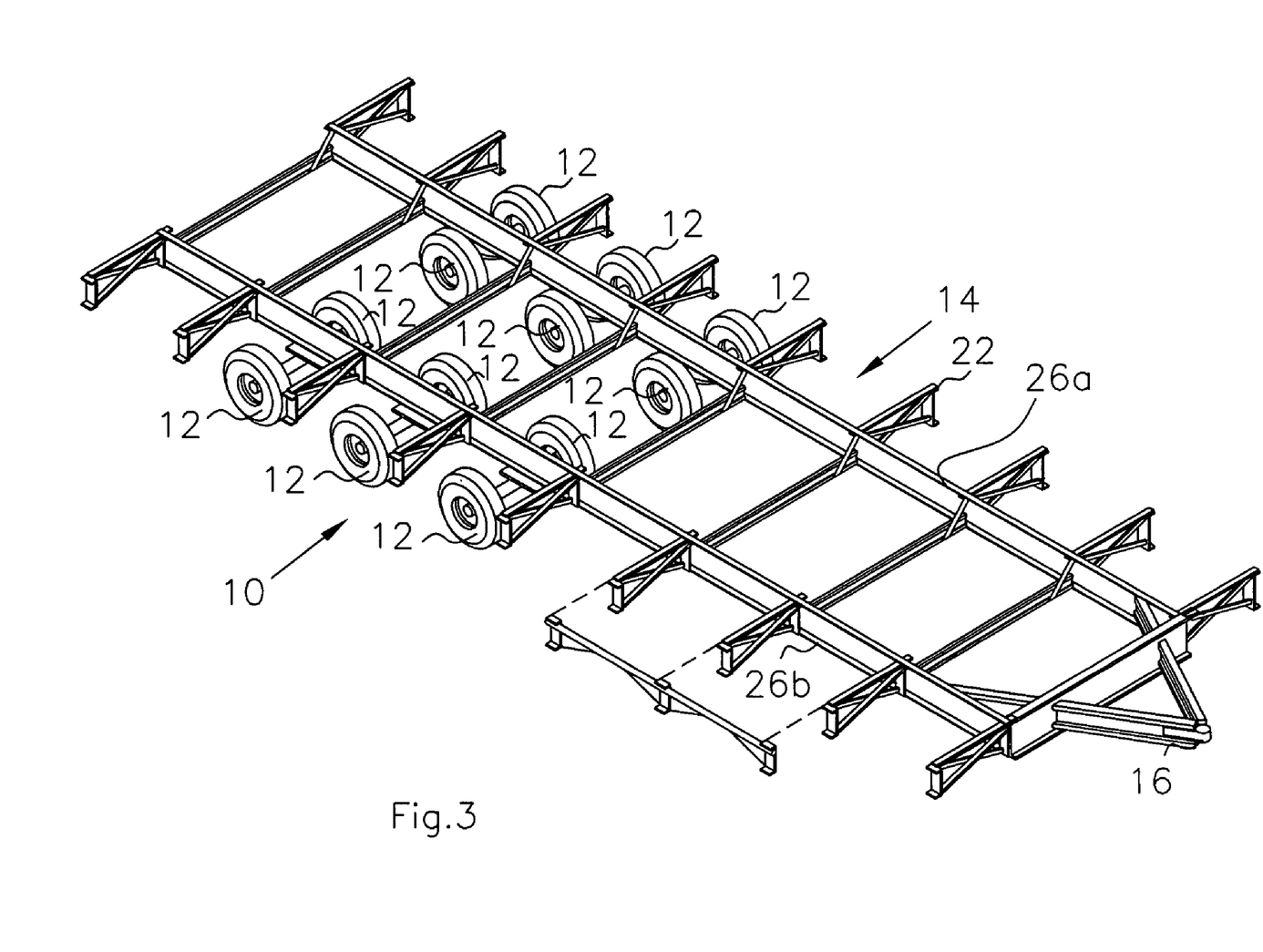
FIG. 3 is a perspective view of the depiction of FIG. 2 with the present invention being utilized.

As depicted in FIG. 3, six portable axle and tire assemblies, as envisioned by the present invention and is generally depicted as 10, are mounted to the two longitudinal I-beams 26a,26b of the frame 14. As can be seen, twelve tires 12 can be used with the present invention. In this case, the frame 14 and outriggers 22,22a of FIG. 2 is depicted. In the embodiment as depicted in FIG. 3, the transverse axle 24, as shown in FIG. 2, is eliminated.

Figure 4:
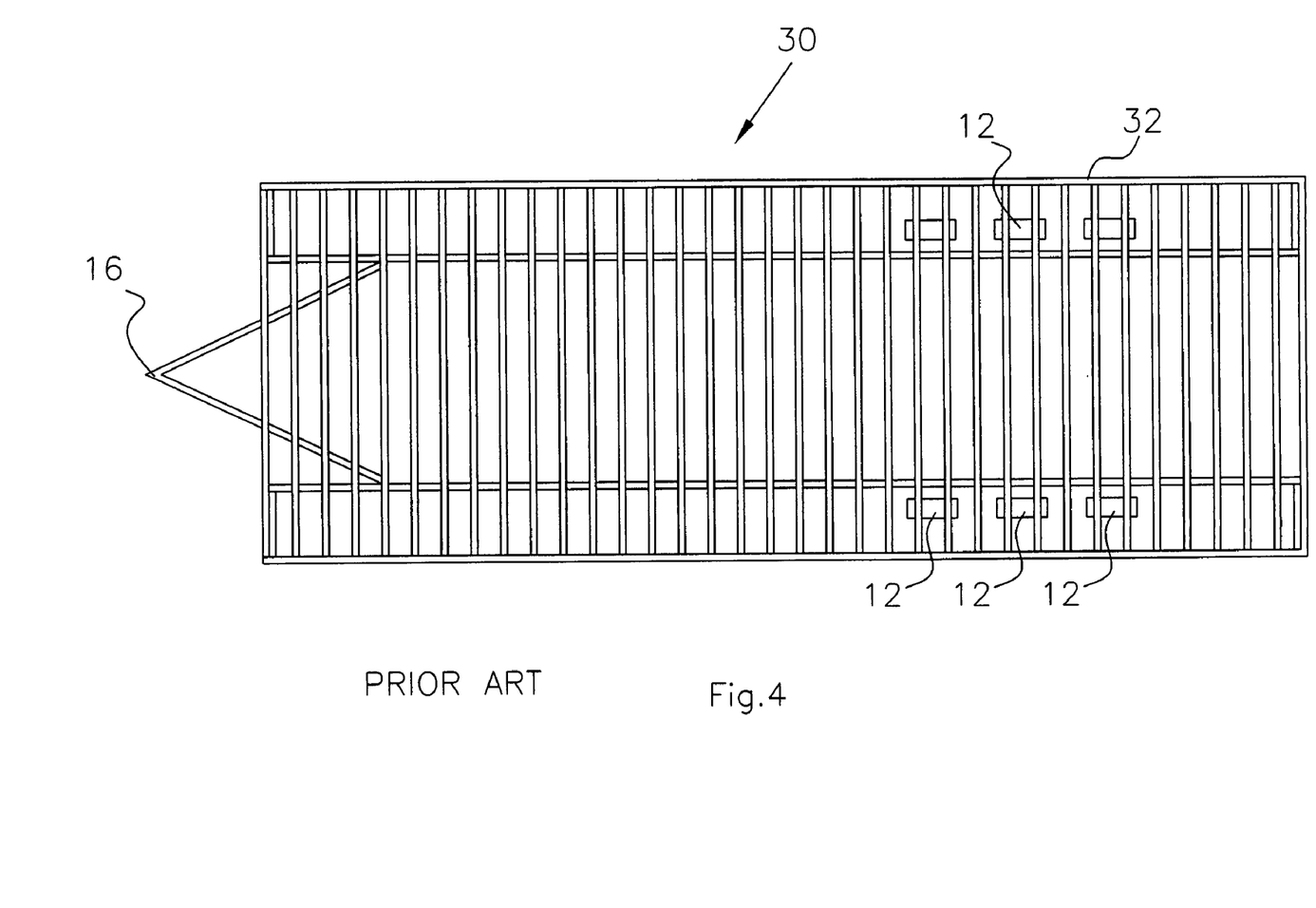
FIG. 4 is a plan view of a traditional floor joist system using the traditional axle and wheel system.
Figure 5:
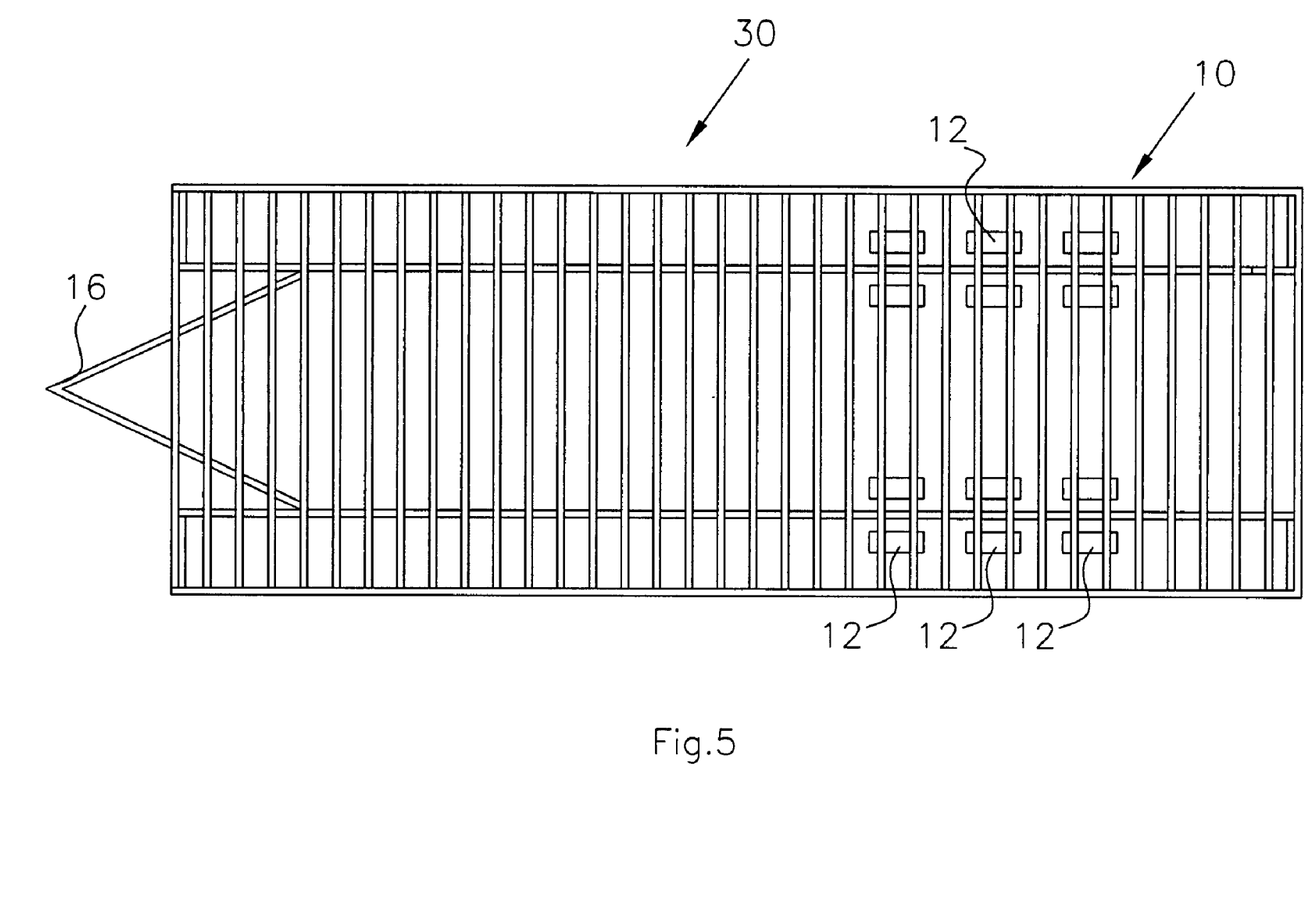
FIG. 5 is a plan view of the traditional floor joist system of FIG. 4 utilizing the present invention.

FIG. 4 is a plan view of a traditional floor joist system 30 with outside rails 32, showing the use of six tires 12 typical of the prior art. FIG. 5 is a depiction of the joist system 30 of FIG. 4 incorporating the present invention 10. The present invention 10 fastens each portable axle and tire assembly 10 to each longitudinal I-beam thereby allowing more tires 12 to be installed on a carrier that transports manufactured homes to the building site.

The use of the present invention as depicted in FIG. 5 provides increased load support for the manufactured building over the support of a frame system using six tires. With twelve tires, the manufactured building may be transported down the highway in a much safer manner than heretofore methods. In addition, the additional tires provides a better ride for the manufactured building so the home has less problems, such as cracks, broken windows, out of square windows and doorways, among other problems, once it arrives on the building site.

The outstanding feature about the present invention is that you now can use these assemblies over & over due to the way they are designed and thereby reduce the cost of a manufactured home considerably. This portable axle and tire assembly makes the manufactured building safer for moving down the highway. The low profile obtained by the saddle configuration allows a reduction in height of the manufactured building floor system of about 10 inches. This, in turn, allows a manufacturer to increase the roof pitch considerably, which makes the home better in appearance and helps to remove rain and snow.

Federal regulations currently require that the top of the roof of a manufactured home can only be 13'6". Allowing a lower profile during transport will enable manufacturers to manufacture and sell improved design manufactured buildings. In addition, manufactured homes will be able to be constructed with heavier duty designs which are typically heavier in weight. The additional load bearing capacities generated by the use of 12 wheels in lieu of the traditional six wheels will facilitate the transportation of heavier manufactured buildings. As previously mentioned, it is estimated that a cost savings of about $1600 to $2000 will be generated using this innovative technology. Further, by distributing the load to twelve wheels in lieu of the traditional six wheels, road damage from heavy loads is minimized.

Generally, the present invention is a method of transporting a manufactured building over the highways using a plurality of portable axle and tire assemblies which are temporarily mounted to each longitudinal beam of the frame of a manufactured building being transported over a road. Although it is anticipated that at least six assemblies will normally be used, three attached to each of the longitudinal beams of the frame, in some cases for smaller length homes, two or four assemblies may be used.

Each assembly comprises:

a pair of spaced-apart rims for mounting tires thereon, each rim mounted to a hub extension, which is in turn attached to a vertically aligned yolk, having an upper portion and a lower portion, the vertically aligned yolk attached at its lower portion to a corresponding end of an axle;

a pair of springs and means for clamping said pair of springs to said axle at an approximate midpoint of said springs;

a saddle assembly having front and rear transverse members spaced-apart a predetermined distance fore and aft of the axle, the saddle assembly further having opposite upright members attached to each of the front and rear transverse members so as to be configured for saddling and receiving the longitudinal beam of the frame of the manufactured building to be transported, and each upright member being interconnected with a corresponding longitudinal member at the upper end of each upright member;

an opposite end of each of the pair of springs being attached to opposite ends of the longitudinal member juxtaposed each corresponding upright member; and means for temporarily attaching the saddle assembly to a flange of the longitudinal beam of the frame of the manufactured building to be transported.

In one embodiment, the means for temporarily attaching the saddle assembly to a flange of the longitudinal beam of the frame of the manufactured building to be transported comprises:

two tabs integrally attached to and extending from an upper surface of each transverse member of the saddle assembly, the tabs being in a spaced-apart relationship on each transverse member such that the longitudinal beam of the frame runs between said tabs, and said tabs further being aligned such that an aperture in each tab aligns with another aperture in another corresponding tab integrally attached on each side of the flange of the longitudinal beam.

A major advantage of the present invention is that each assembly is rated for approximately 6000 lbs. load to about 7000 lb. load. Assuming a 7000 lb. load capacity, when one is put on the right and one on the left, there is now 14000 lbs. where the axle used today has one 3500 lb. on the left side and one 3500 lb. capacity on the right side for a total of 7000 lbs. The present invention improves the safety aspects of transporting buildings tremendously. For example, with five sets on the right side and five sets on the left side, a total of 70,000 lbs. capacity is obtained. Further, with each assembly having its own braking means, the braking capacity is doubled.

In addition, by using more tires underneath a manufactured building, the load is more effectively distributed over the highway, thereby reducing the possibility of road damage and the need for more frequent road repair. For example, the state of Minnesota will not allow a building to be transported over its highways with more than six axles. With the present invention, longer and heavier buildings can be transported. Where a larger variety of size buildings can be transported using the present invention, the consequential impact is more jobs in Minnesota.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

As depicted in FIG. 3, six portable axle and tire assemblies, as envisioned by the present invention and is generally depicted as 10, are mounted to the two longitudinal I-beams 26a,26b of the frame 14. As can be seen, twelve tires 12 can be used with the present invention. In this case, the frame 14 and outriggers 22,22a of FIG. 2 is depicted. In the embodiment as depicted in FIG. 3, the transverse axle 24, as shown in FIG. 2, is eliminated.

FIG. 5 is a depiction of the joist system 30 of FIG. 4 incorporating the present invention 10. The present invention 10 fastens each portable axle and tire assembly 10 to each longitudinal I-beam thereby allowing more tires 12 to be installed on a carrier that transports manufactured homes to the building site.

Figure 6:
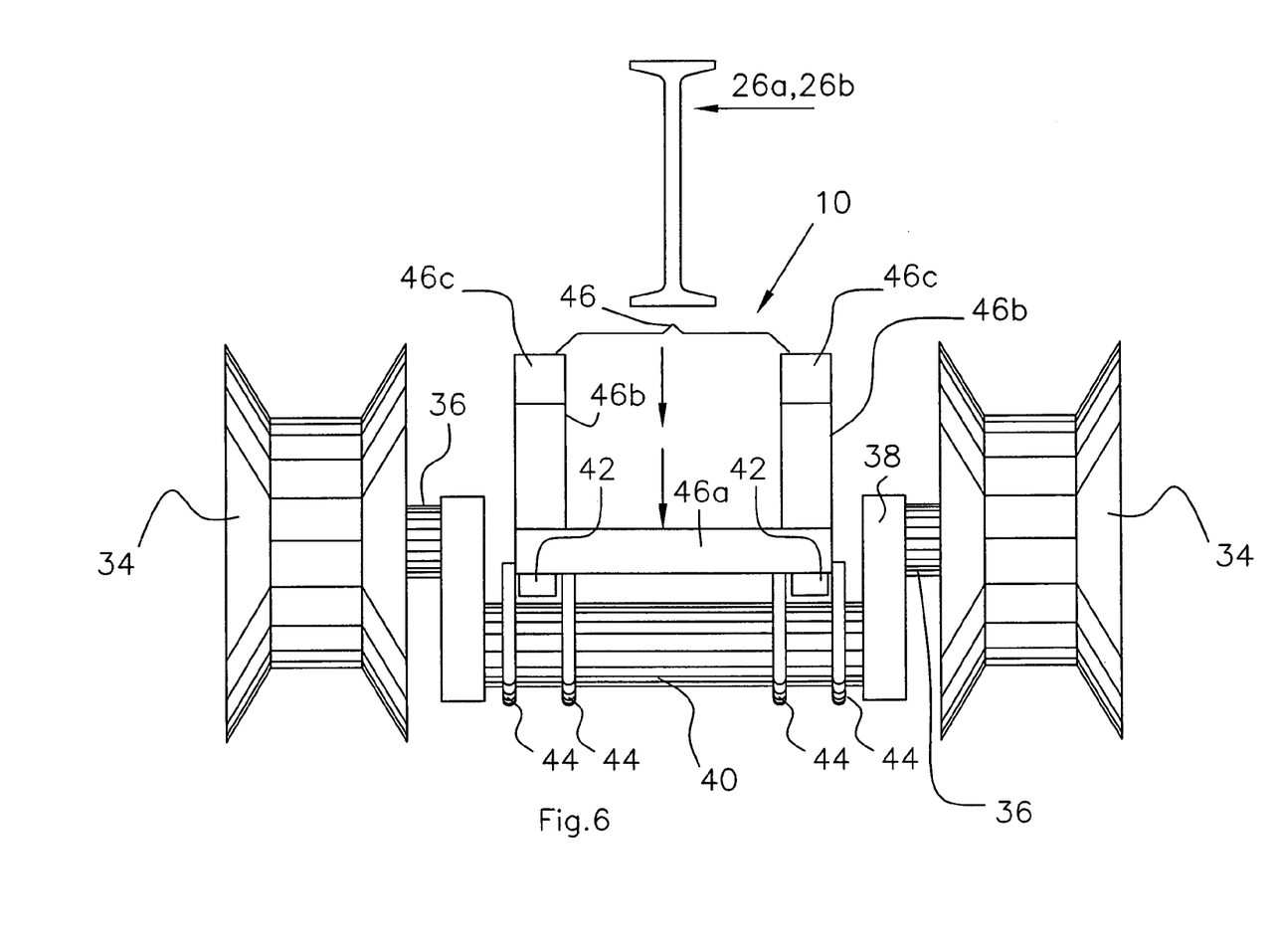
FIG. 6 is a perspective frontal elevation view of the present invention.
Figure 7:
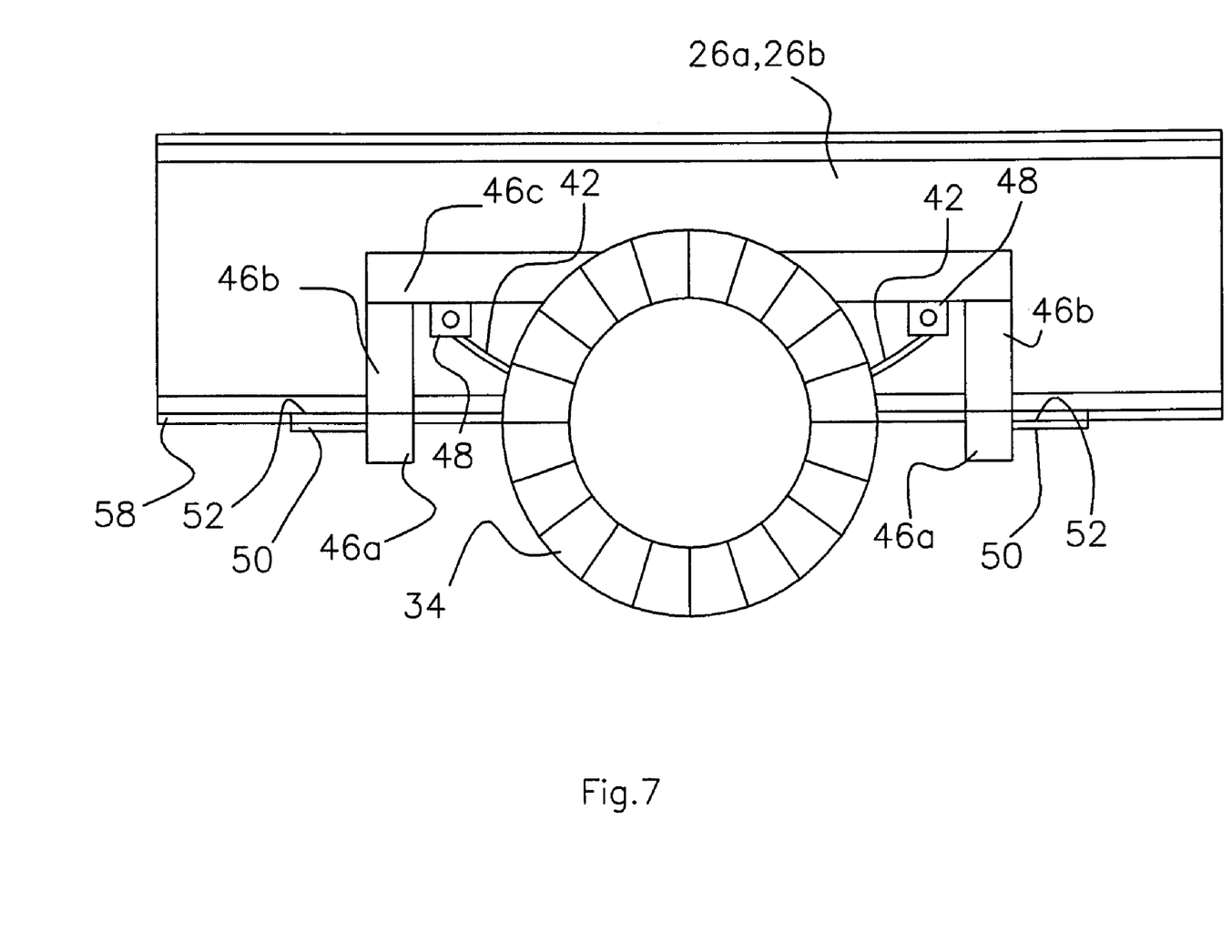
FIG. 7 is a side elevation view of the present invention.
Figure 8:
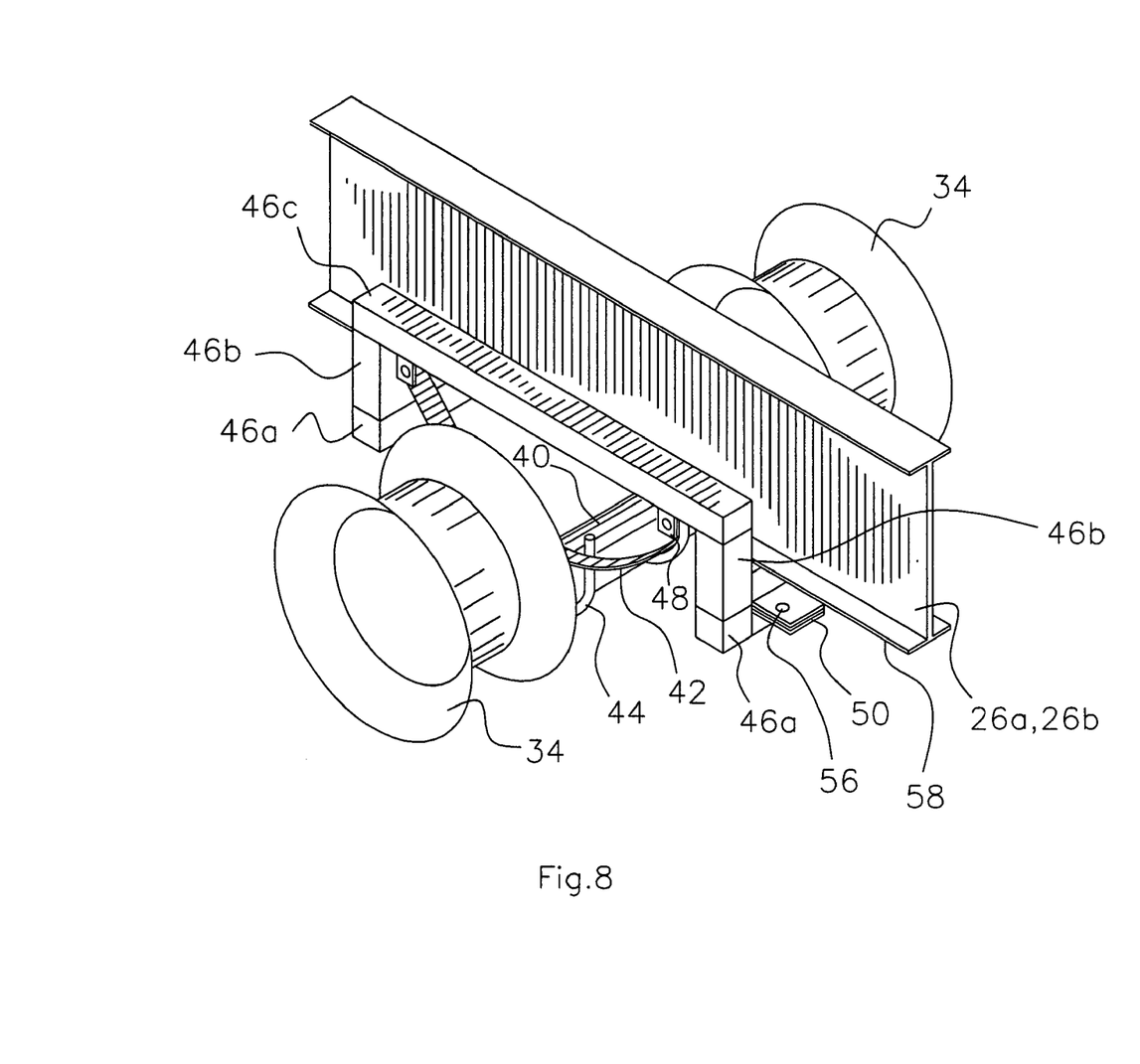
FIG. 8 is a perspective view of an I-beam resting within the present invention.

FIG. 6 is a depiction of a frontal view of the present invention 10, wherein tire rim 34 for mounting tires 12 are located on each side of assembly 10. Each rim 34 is, in turn, mounted to hub extensions 36, which are in turn fastened to yolk 38 at one end of said yolk. The yolks 38 are joined together with axle 40 at the respective opposite ends of said yolks 38. The yolks 38 are vertically aligned such that the axle 40 is lower than the centerline of the wheel hubs extensions 36 and tires 12. This allows the dropping of the carrier frame I-beams 26a,26b as much as 10 inches. Axle 40 is typically no more than a short piece of round steel stock interconnecting the yolks 38. Spring holders 44, shaped like U-bolts, are used to clamp the springs 42, at an approximate mid-point of the springs 42, to the axle 40. A saddle assembly 46 mounts to the opposite ends of each spring 42. The saddle assembly 46 is typically made of steel tubing wherein front and rear transverse members 46a are spaced apart a predetermined distance fore and aft of the axle 40. The longitudinal vertical sides of the saddle assembly 46 are formed with upright members 46b extending a predetermined distance from the ends of the front and rear transverse members 46a. These ends are typically welded together. The upright most ends of each of the upright members 46b on each side of the saddle assembly 46 are in turn joined together with a longitudinal member 46c which is welded to each end of the upright members 46b, thereby forming a saddle configuration. As shown in FIG. 7, the spring 42 ends are fastened to an attachment at 48 under longitudinal members 46c juxtaposed each corresponding upright members 46b.

As shown in FIGS. 7–10, transverse members 46a, each have two tabs 50 integrally attached to and extending from an upper surface of each transverse member 46a. The tabs 50 are in a spaced apart relationship on the transverse member 46a such that the I-beam 26a,26b will run between said tabs 50 and said tabs 50 are further aligned such that an aperture 54 in each tab 50 aligns with an aperture 56 in a corresponding tab 52 integrally attached on each side of the bottom flange 58 of the I-beam 26a,26b.

The apertures 54 and 56 in tabs 50 and 52 provide means to bolt or otherwise fasten the portable axle and tire assembly 10 to the load carrying I-beams 26a,26b so that a manufactured building can be shipped over the highways. Quick-connect pins may be used as well as standard fasteners.

Figure 9:
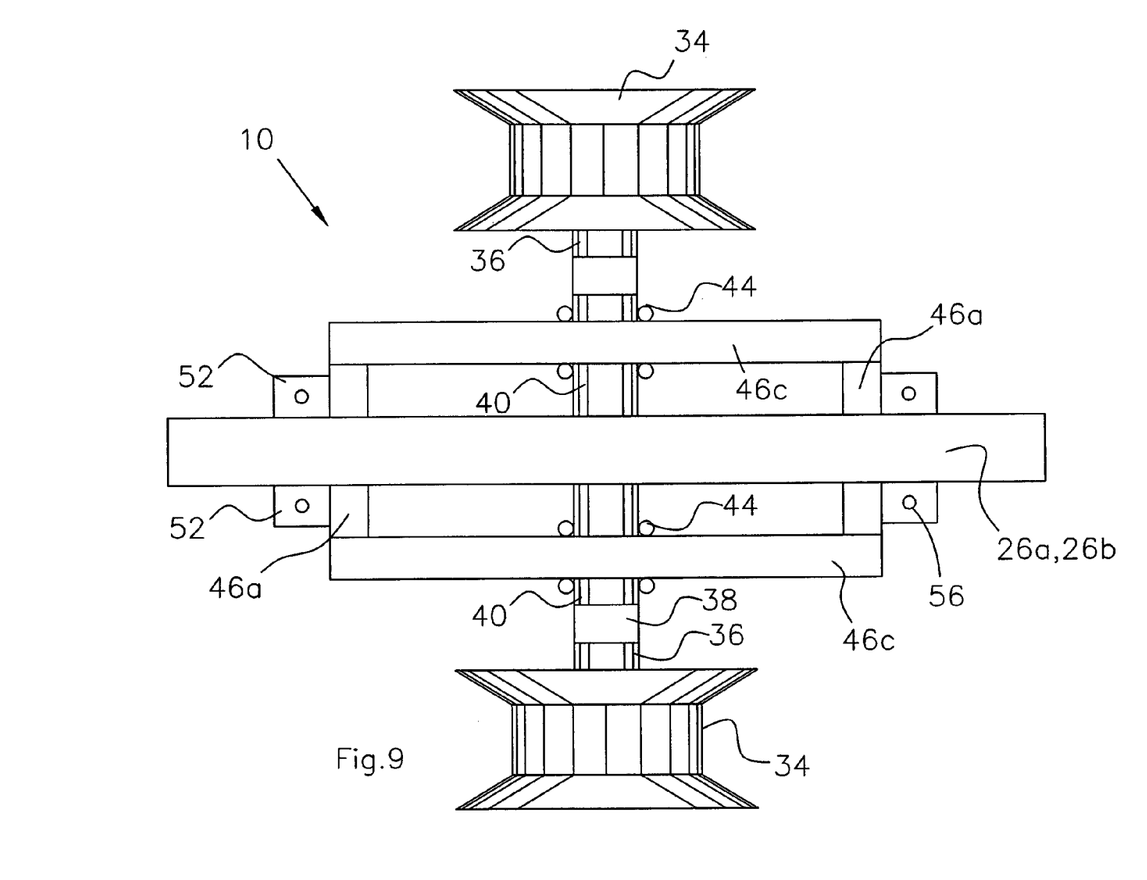
FIG. 9 is a plan view of the present invention with an I-beam resting within the assembly.
Figure 10:
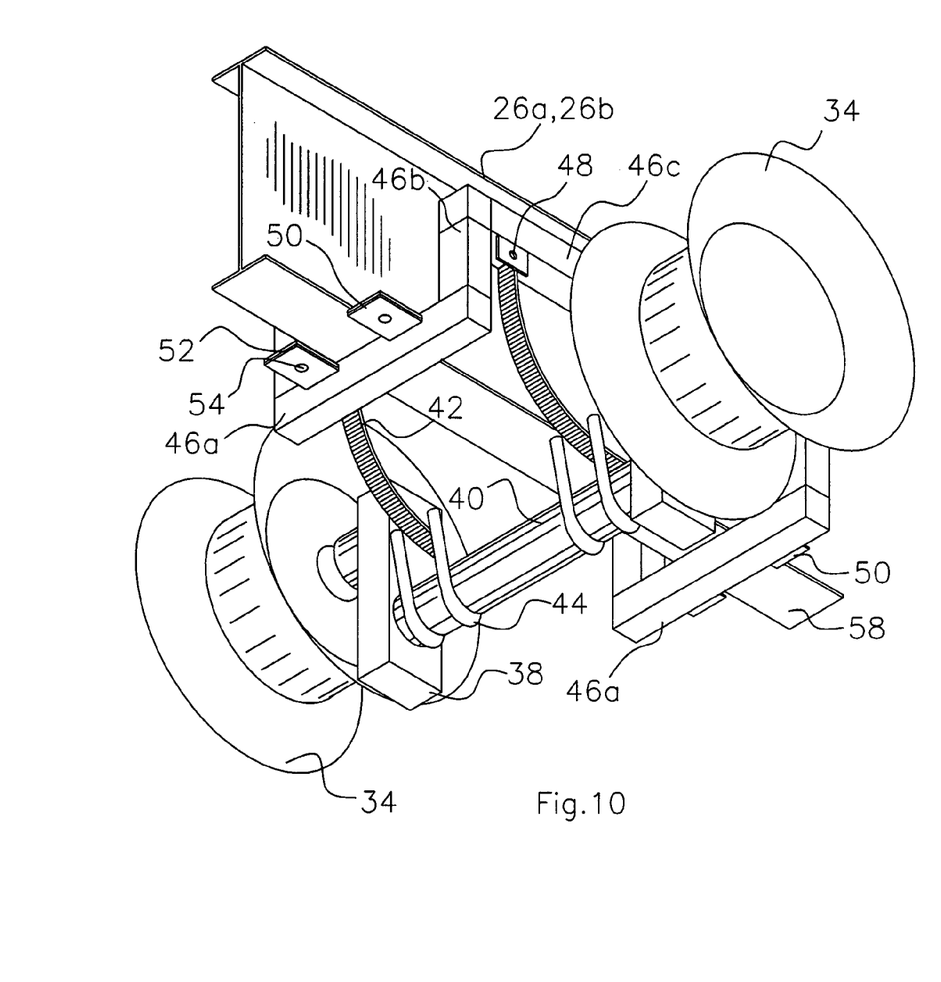
FIG. 10 is a perspective bottom view of the present invention within an I-beam resting within the invention.

FIG. 9 is a plan view of the I-beam 26a,26b sitting in the portable axle and tire assembly 10. FIG. 10 depicts a perspective bottom view looking up at the bottom of the present invention 10.

As seen from the foregoing description, the present invention satisfies a long felt need to provide a device to improve the means of transporting manufactured buildings over the highways in a safer manner with significant cost savings.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

What is claimed is:

1. A portable axle and tire assembly for temporary mounting to each longitudinal beam of the frame of a manufactured building to be transported over a road, the assembly comprising:
   a pair of spaced-apart rims for mounting tires thereon, each rim mounted to a hub extension, which is in turn attached to a vertically aligned yolk, having an upper portion and a lower portion, the vertically aligned yolk attached at its lower portion to a corresponding end of an axle;
   a pair of springs and means for clamping said pair of springs to said axle at an approximate midpoint of said springs;
   a saddle assembly having front and rear transverse members spaced-apart a predetermined distance fore and aft of the axle, the saddle assembly further having opposite upright members attached to each of the front and rear transverse members so as to be configured for saddling and receiving the longitudinal beam of the frame of the manufactured building to be transported, and each upright member being interconnected with a corresponding longitudinal member at the upper end of each upright member;
   an opposite end of each of the pair of springs being attached to opposite ends of the longitudinal member juxtaposed each corresponding upright member; and
   means for temporarily attaching the saddle assembly to a flange of the longitudinal beam of the frame of the manufactured building to be transported.

2. The portable axle and tire assembly according to claim 1, wherein the means for temporarily attaching the saddle assembly to a flange of the longitudinal beam of the frame of the manufactured building to be transported comprises:
   two tabs integrally attached to and extending from an upper surface of each transverse member of the saddle assembly, the tabs being in a spaced-apart relationship on each transverse member such that the longitudinal beam of the frame runs between said tabs, and said tabs further being aligned such that an aperture in each tab aligns with another aperture in another corresponding tab integrally attached on each side of the flange of the longitudinal beam.

3. The portable axle and tire assembly according to claim 1, wherein at least two portable axle and tire assemblies are removably attached in a spaced-apart relationship to each longitudinal beam of the frame of the manufactured building to be transported.

4. The portable axle and tire assembly according to claim 1, wherein each assembly has a load capacity of approximately 6000 lbs. to 7000 lbs.

5. A method of transporting a manufactured building over the road, the method comprising:
   assembling a plurality of axle and tire assemblies by:
      providing a pair of spaced-apart rims for mounting tires thereon, each rim mounted to a hub extension, which is in turn attached to a vertically aligned yolk, having an upper portion and a lower portion, the vertically aligned yolk attached at its lower portion to a corresponding end of an axle;
      providing a pair of springs and means for clamping said pair of springs to said axle at an approximate midpoint of said springs;
      providing a saddle assembly having front and rear transverse members spaced-apart a predetermined distance fore and aft of the axle, the saddle assembly further having opposite upright members attached to each of the front and rear transverse members so as to be configured for saddling and receiving the longitudinal beam of the frame of the manufactured building to be transported, and each upright member being interconnected with a corresponding longitudinal member at the upper end of each upright member;
      providing an opposite end of each of the pair of springs being attached to opposite ends of the longitudinal member juxtaposed each corresponding upright member;
      providing means for temporarily attaching the saddle assembly to a flange of the longitudinal beam of the frame of the manufactured building to be transported, and attaching a plurality of at least two of the portable axle and tire assemblies in a spaced-apart relationship to each longitudinal beam of the frame of the manufactured building to be transported.

6. The method according to claim 5, wherein the means for temporarily attaching the saddle assembly to a flange of the longitudinal beam of the frame of the manufactured building to be transported comprises:
   two tabs integrally attached to and extending from an upper surface of each transverse member of the saddle assembly, the tabs being in a spaced-apart relationship on each transverse member such that the longitudinal beam of the frame runs between said tabs, and said tabs further being aligned such that an aperture in each tab aligns with another aperture in another corresponding tab integrally attached on each side of the flange of the longitudinal beam.

7. The method according to claim 5, wherein each assembly has a load capacity of approximately 6000 lbs. to 7000 lbs.

* * * * *